US012742249B2

(12) United States Patent
Lin

(10) Patent No.: US 12,742,249 B2
(45) Date of Patent: Sep. 22, 2026

(54) HYDROGEN GENERATOR WITH A HYDROGEN LEAK CONSCIOUS FUNCTION

(71) Applicant: Hsin-Yung Lin, Taoyuan (TW)

(72) Inventor: Hsin-Yung Lin, Taoyuan (TW)

( * ) Notice: Subject to any disclaimer, the term of this patent is extended or adjusted under 35 U.S.C. 154(b) by 814 days.

(21) Appl. No.: 18/006,520

(22) PCT Filed: Jun. 9, 2021

(86) PCT No.: PCT/CN2021/099044
§ 371 (c)(1),
(2) Date: Jan. 23, 2023

(87) PCT Pub. No.: WO2022/017035
PCT Pub. Date: Jan. 27, 2022

(65) Prior Publication Data

US 2023/0272544 A1 Aug. 31, 2023

(30) Foreign Application Priority Data

Jul. 23, 2020 (CN) ......................... 202010714725.2

(51) Int. Cl.
*C25B 1/00* (2021.01)
*C25B 1/04* (2021.01)
(Continued)

(52) U.S. Cl.
CPC .............. *C25B 15/023* (2021.01); *C25B 1/04* (2013.01); *C25B 9/00* (2013.01); *G01M 3/04* (2013.01)

(58) Field of Classification Search
CPC .......... G01M 3/04; C25B 15/023; C25B 1/04; C25B 9/00
See application file for complete search history.

(56) References Cited

U.S. PATENT DOCUMENTS

2013/0206586 A1* 8/2013 Lin ......................... C25B 15/02 204/230.2
2016/0108528 A1 4/2016 Lin
(Continued)

FOREIGN PATENT DOCUMENTS

CN 203609733 U 5/2014
CN 204959046 U 1/2016
(Continued)

OTHER PUBLICATIONS

Vietnamese Office Action dated Oct. 16, 2024 for VN Patent Application No. 1-2023-00366.
(Continued)

*Primary Examiner* — Zulmariam Mendez

(57) ABSTRACT

A hydrogen generator with hydrogen leakage self-aware function comprises an electrolytic module, an integrated passageway device, a condensate filter, a humidification cup, a housing, an internal hydrogen sensing component, and a monitoring device. The electrolytic module is configured to electrolyze an electrolyzed water to generate a gas comprising hydrogen. The integrated passageway device comprises gas inlet passageway and a gas outlet passageway. The condensate filter is configured for filtering the gas comprising hydrogen. The humidification cup is configured for humidifying the gas comprising hydrogen. The gas comprising hydrogen flows through the condensate filter and the humidification cup by the way of the integrated passageway device. The internal hydrogen sensing component is configured in the housing for sensing the hydrogen concentration in the housing to generate an internal sensing result. The monitoring device is coupled to the internal hydrogen sensing component. The monitoring device controls the operation of the hydrogen generator according to the internal
(Continued)

sensing result to avoid the hydrogen generator from the problem caused by hydrogen.

18 Claims, 12 Drawing Sheets

(51) Int. Cl.

| | |
|---|---|
| ***C25B 9/00*** | (2021.01) |
| ***C25B 15/023*** | (2021.01) |
| ***G01M 3/04*** | (2006.01) |

(56) References Cited

U.S. PATENT DOCUMENTS

| | | | | |
|---|---|---|---|---|
| 2018/0228995 | A1 | 8/2018 | Lin | |
| 2019/0062933 | A1 | 2/2019 | Lin | |
| 2020/0173036 | A1 | 6/2020 | Lin | |
| 2020/0352985 | A1* | 11/2020 | Lin | C25B 9/00 |

FOREIGN PATENT DOCUMENTS

| | | | |
|---|---|---|---|
| CN | 106906483 | A | 6/2017 |
| CN | 107349094 | A | 11/2017 |
| CN | 108624901 | A | 10/2018 |
| CN | 208008909 | U | 10/2018 |
| CN | 110184616 | A | 8/2019 |
| CN | 108103520 | B | 4/2020 |
| CN | 111270255 | A | 6/2020 |
| JP | 2006-22378 | A | 1/2006 |
| JP | 2018034148 | A | 3/2018 |
| JP | 2019039069 | A | 3/2019 |
| JP | 2019-143250 | A | 8/2019 |
| JP | 2020-2001 | A | 1/2020 |
| JP | 2020097782 | A | 6/2020 |
| TW | I668332 | B | 8/2019 |
| WO | 2016133262 | A1 | 8/2016 |

OTHER PUBLICATIONS

Singapore Written Opinion dated Nov. 22, 2024 for SG patent Application No. 11202300513R.

Notification of Reasons for Refusal dated Sep. 10, 2024 for JP Patent Application No. 2023-503454.

European Search Report dated Feb. 6, 2025 for European Patent Application No. 21846675.3.

International Search Report dated Aug. 26, 2021 for International Application No. PCT/CN2021/099044.

* cited by examiner

E

10 Housing

Fan 14

11 Monitoring device

12 Internal hydrogen sensing component

21 Water tank

Electrolytic module 22

23 Integrated passageway device

Humidification cup 25

28 Nebulizer

HYDROGEN GENERATOR WITH A HYDROGEN LEAK CONSCIOUS FUNCTION

BACKGROUND OF THE INVENTION

1. Field of the Invention

The present invention relates to a hydrogen generator. More particularly, to a hydrogen generator with a hydrogen leak conscious function.

2. Description of the Prior Art

As people have always been paying much attention on health developments, many developments in medical technology are often targeted on treating diseases and prolonging human life. Most of the treatments in the past are passive, which means that the disease is treated only when it occurs. The treatments include an operation, a medication treatment, a radiation therapy, or even a medical treatment for cancer. However, in recent years, most of the researches from medical experts are gradually moving towards preventive medical methods, such as research on healthy food, screening and the prevention of inherited diseases, which actively prevents diseases from occurring in the future. Due to the focus of the prolongation of human life, many anti-aging and anti-oxidation technologies including skin care products and anti-oxidation food/medicine are gradually being developed and becoming increasingly popular to the general public.

Studies have found that there are instable oxygen species (O+), also known as free radicals, in the human body, wherein the free radicals are usually generated due to diseases, diet, environment or one's lifestyle. Free radicals are atoms, molecules or ions with a single unpaired electron. Free radicals will attack human cell membranes, cells, and tissues to rob electrons from other atoms, resulting in a chain peroxidation reaction in the human body. Peroxidation reaction will lead to degenerative syndromes, such as fragile blood vessels, aging brain cells, fragile immune system, cataracts, degenerative arthritis, sagging skin, and general aging. Many studies have pointed out that hydrogen-rich water can easily enter cell channels to be absorbed, participate in human metabolism, and promote cell detoxification due to its small molecular particles. Drinking hydrogen-rich water can indirectly reduce the number of free radicals in the human body, restore the body condition from an acidic state to a healthy alkaline state, and achieve the effect of eliminating chronic diseases and beautifying the skin.

In the prior art, the gas comprising hydrogen and hydrogen-containing water may be produced by a hydrogen gas generator or a hydrogen water generator. The existing hydrogen generators or hydrogen water generators are mostly researched and developed in the direction of hydrogen production efficiency, however, hydrogen gas generators or hydrogen water generators do not have a hydrogen leakage self-aware function. Hydrogen is a highly flammable and explosive gas that can burn as long as the volume ratio in air is between 4% and 75%. While the concentration of hydrogen mixed with air is between 4% and 74%, an explosive mixture is formed which may be ignited by sparks, high temperature or sunlight. Moreover, hydrogen is a colorless and odorless gas that is difficult for people to detect when hydrogen leaks. It is a serious concern to avoid hydrogen explosion. In this regard, providing a hydrogen generator with a hydrogen leak conscious function is an urgent study issue at present

SUMMARY OF THE INVENTION

In view of this, the present invention provides a hydrogen generator with hydrogen leakage self-aware function comprising an electrolytic module, an integrated passageway device, a condensate filter, a humidification cup, a housing, an internal hydrogen sensing component, and a monitoring device. The electrolytic module is configured to electrolyze an electrolyzed water to generate gas comprising hydrogen. The integrated passageway device comprises a gas inlet passageway and a gas outlet passageway, wherein the integrated passageway device is one-piece formed. The condensate filter is coupled to the integrated passageway device for filtering the gas comprising hydrogen, wherein the integrated passageway device has a space for accommodating the condensate filter. The humidification cup is coupled to the integrated passageway device for humidifying the gas comprising hydrogen, wherein the gas comprising hydrogen flows through the condensate filter and the humidification cup by the way of the integrated passageway device. The housing has an accommodating space configured to accommodating the electrolytic module, the integrated passageway device, the humidification cup, and the condensate filter. The internal hydrogen sensing component is configured in the accommodating space for sensing the hydrogen concentration in the housing to generate an internal sensing result. The monitoring device is coupled to the internal hydrogen sensing component, wherein the monitoring device controls the operation of the hydrogen generator according to the internal sensing result.

The hydrogen generator further comprises a fan embedded in the housing and coupled to the monitoring device. The fan is configured to import air outside the housing into the accommodating space. Wherein, the monitoring device controls the fan according to the internal sensing result to import the air outside the housing into the accommodating space.

The hydrogen generator further comprises an external hydrogen sensing component configured outside the housing to communicate with the monitoring device, the external hydrogen sensing component is configured to sense the hydrogen concentration outside the hydrogen generator to generate an external sensing result. Wherein, the monitoring device controls the operation of the hydrogen generator according to the external sensing result.

Besides, the monitoring device is coupled to the electrolytic module, the monitoring device turns off or reduces the operating efficiency of the electrolytic module according to the external sensing result.

The hydrogen generator further comprises a nebulizer coupled to the gas outlet passageway to receive the gas comprising hydrogen. Wherein, the nebulizer generates an atomized gas and mix the atomized gas with the gas comprising hydrogen to form a healthy gas. The gas comprising hydrogen flows through the condensate filter, the humidification cup and the nebulizer by the way of the integrated passageway device.

The hydrogen generator further comprises a water tank configured to accommodate the electrolyzed water. The electrolytic module is configured in the water tank, the water tank outputs the gas comprising hydrogen generated by the electrolytic module, and the humidification cup is stacked vertically on the tank.

Furthermore, the integrated passageway device is stacked vertically on the humidification cup.

Moreover, the humidification cup further has a humidification room and a communicating room. The communicating room is coupled to the water tank and the condensate filter. The communicating room is configured to receive the gas comprising hydrogen outputted from the water tank. The humidification room is configured to accommodate supplementary water and receive the gas comprising hydrogen outputted from the condensate filter. The humidification room and the communicating room are isolated from each other.

The hydrogen generator further comprises a filter rod coupled to the integrated passageway device for filtering the gas comprising hydrogen. The gas comprising hydrogen flows through the condensate filter, the humidification cup, the filter rod and the nebulizer by the way of the integrated passageway device.

In addition, the humidification cup further has a filter room. The filter rod is configured in the filter room pluggably.

Next, the filter rod comprises a flame arrester. The flame arrester is configured in the hydrogen generator pluggably along with the filter rod.

The hydrogen generator further comprises a hydrogen water cup coupled to the integrated passageway device. The hydrogen water cup is configured to contain water and receive the gas comprising hydrogen to form a hydrogen water. Wherein, the gas comprising hydrogen flows through the condensate filter, the humidification cup, the filter rod, the hydrogen water cup and the nebulizer by the way of the integrated passageway device.

The hydrogen generator further comprises a hydrogen water cup coupled to the integrated passageway device. The hydrogen water cup is configured to contain water, the hydrogen water cup receives the gas comprising hydrogen selectively.

Then, the integrated passageway device has a flip structure for the condensate filter to be moveably embedded into the integrated passageway device.

The present invention also provides a hydrogen generator with hydrogen leakage self-aware function. The hydrogen generator with hydrogen leakage self-aware function comprises a water tank, an electrolytic module, an integrated passageway device, a nebulizer, a housing, an internal hydrogen sensing component, an external hydrogen sensing component, a monitoring device. The water tank is configured to accommodate a electrolyzed water. The electrolytic module is configured to electrolyze the electrolyzed water to generate gas comprising hydrogen, wherein the electrolytic module is configured in the water tank, the water tank outputs the gas comprising hydrogen generated by the electrolytic module. The integrated passageway device is connected to the water tank. The nebulizer is coupled to the gas outlet passageway to receive the gas comprising hydrogen, wherein the nebulizer generates an atomized gas and mix the atomized gas with the gas comprising hydrogen to form a healthy gas. The housing has an accommodating space configured to accommodating the water tank, the integrated passageway device, and the nebulizer. The internal hydrogen sensing component is configured in the accommodating space for sensing the hydrogen concentration outside the electrolytic module, the integrated passageway device, and the nebulizer to generate an internal sensing result. The external hydrogen sensing component is configured outside the housing to sense the hydrogen concentration outside the hydrogen generator to generate an external sensing result. The monitoring device is coupled to the internal hydrogen sensing component and the external hydrogen sensing component, the monitoring device controls the operation of the hydrogen generator according to the internal sensing result and the external sensing result.

The present invention also provides a hydrogen generator with hydrogen leakage self-aware function. The hydrogen generator with hydrogen leakage self-aware function comprises an electrolytic module, an integrated passageway device, a condensate filter, a humidification cup, a hydrogen water cup, a housing, an internal hydrogen sensing component, and a monitoring device. The electrolytic module is configured to electrolyze an electrolyzed water to generate gas comprising hydrogen. The condensate filter is coupled to the integrated passageway device for filtering the gas comprising hydrogen generated by the electrolytic module. The humidification cup is coupled to the integrated passageway device for humidifying the gas comprising hydrogen. The hydrogen water cup is coupled to the integrated passageway device, wherein the hydrogen water cup is configured to contain water, the hydrogen water cup receives the gas comprising hydrogen selectively. When the gas comprising hydrogen flows into the hydrogen water cup, the gas comprising hydrogen mixes with the water in the hydrogen water cup to form a hydrogen water. The housing is configured to accommodating the electrolytic module, the integrated passageway device, the humidification cup, and the condensate filter, and the hydrogen water cup. The internal hydrogen sensing component is configured in the housing for sensing the hydrogen concentration in the hydrogen generator to generate an internal sensing result. The monitoring device is coupled to the internal hydrogen sensing component, wherein the monitoring device controls the operation of the hydrogen generator according to the internal sensing result.

Compared to the prior art, the hydrogen generator of the present invention has following advantages: (1) The hydrogen generator of the present invention has an internal hydrogen sensing component. When hydrogen gas leakage occurs in the hydrogen generator, the internal hydrogen sensing component send out the internal sensing result, and the monitoring device will control the operation of the hydrogen generator according to the internal sensing result. (2) The monitoring device of the present invention could control the electrolytic module to turn off or reduce the operating efficiency of the electrolytic module according to the external sensing result, in order to avoid the continuous increasing of the concentration of hydrogen. (3) The monitoring device of the present invention can control the fan to introduce external air into the housing, so as to reduce the hydrogen concentration in the housing. (4) The hydrogen generator of the present invention comprises an external hydrogen sensing component in addition to the internal hydrogen sensing component, to make the finest operation of the hydrogen concentration outside the hydrogen generator. (5) The monitoring device of the present invention can also adjust and control the cooling fan according to the sensing results inside the machine and the sensing results outside the machine. In addition to introducing external air, the monitoring device can also directly change the direction of rotation of the cooling fan to exhaust out the internal hydrogen gas, and to reduce the hydrogen concentration quickly. (6) The hydrogen generator of the present invention has the hydrogen leakage self-aware function, which avoids hydrogen explosion during the use of the hydrogen generator, so that the users can use it without worry.

BRIEF DESCRIPTION OF THE APPENDED DRAWINGS

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention. However, it can be implemented in many different forms and is not limited to the embodiments of the present invention or corresponding embodiments. Rather, these embodiments are provided so that this disclosure will be thorough and complete.

The terms used in the various embodiments disclosed of the present invention are only used to describe specific embodiments, and are not intended to limit the various embodiments disclosed of the present invention. As used herein, the singular form also includes the plural form unless the context clearly indicates otherwise. Unless otherwise defined, all terms (including technical and scientific terms) used in this specification have the same meanings as commonly understood by one of ordinary skill in the art to which the various embodiments disclosed herein belong. The above terms (such as those defined in commonly used dictionaries) will be interpreted as having the same meaning as the contextual meaning in the same technical field, and will not be interpreted as having an idealized or overly formal meaning, Unless explicitly defined in the various embodiments disclosed herein.

In the description of this specification, the description with reference to the terms "an embodiment", "a specific embodiment", etc. means that a specific feature, structure, material, or characteristic described in conjunction with the embodiment is included in at least one embodiment of the present invention. In this specification, the schematic expressions of the above terms do not necessarily refer to the same embodiment. Furthermore, the particular features, structures, materials, or characteristics described may be combined in any suitable manner in any one or more embodiments.

In the description of the present invention, unless otherwise specified or limited, it should be noted that the terms "coupled", "connected", and "setup" should be understood in a broad sense. For example, they may be mechanically or electrically connected, may be connected directly, also may be connected by an intermediate medium. For those skilled in the art, the specific meanings of the above terms can be understood according to specific situations.

Figure 1:
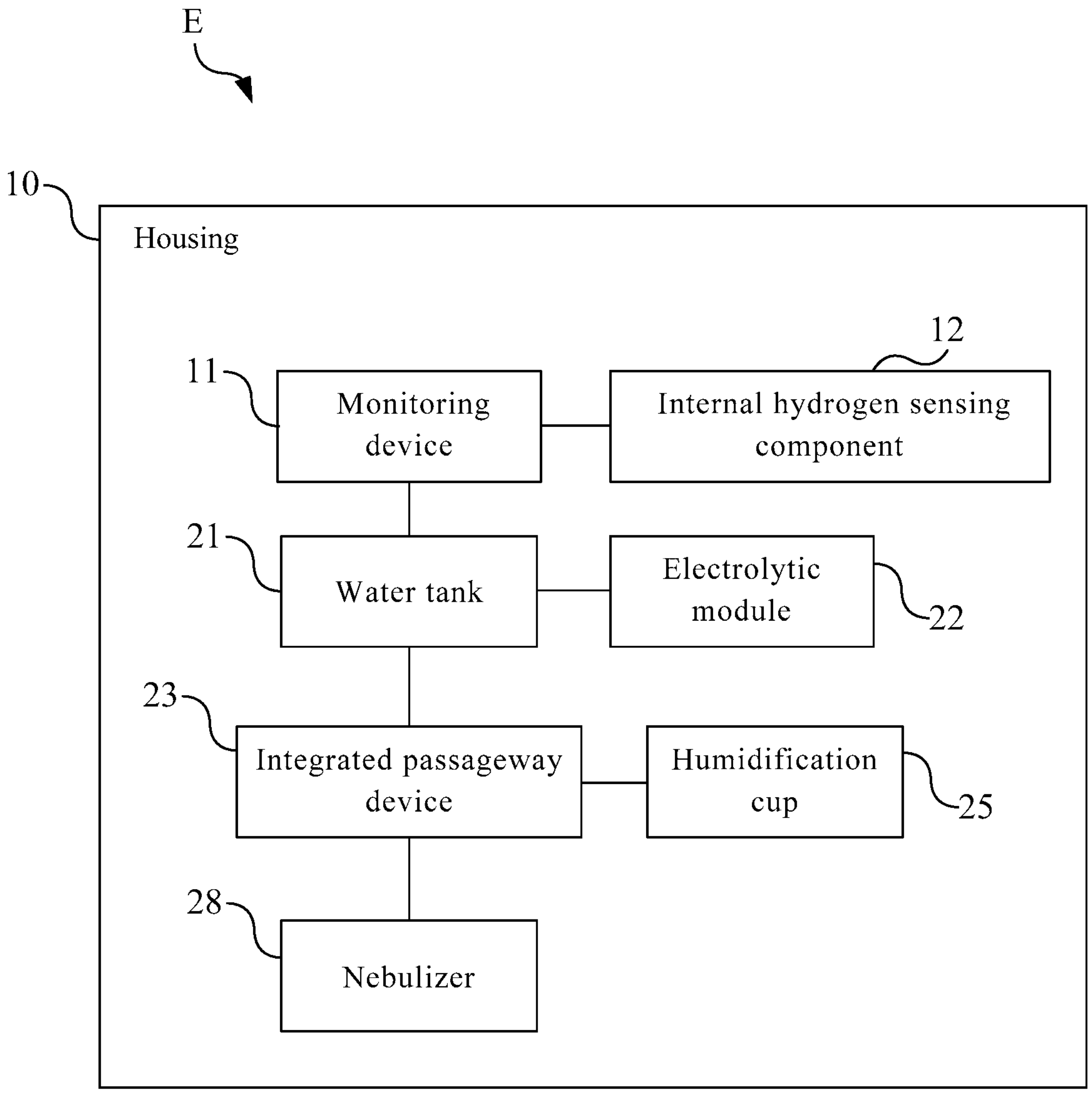
FIG. 1 is a functional block diagram illustrating a hydrogen generator with hydrogen leakage self-aware function according to an embodiment of the present invention.

Please refer to FIG. 1. FIG. 1 is a functional block diagram illustrating a hydrogen generator with hydrogen leakage self-aware function according to an embodiment of the present invention. As shown in FIG. 1, the hydrogen generator E of the present invention comprises a water tank 21, an electrolytic module 22, an integrated passageway device 23, a humidification cup 25, a nebulizer 28, a housing 10, an internal hydrogen sensing component 12, and a monitoring device 11. The electrolytic module 22 is configured in the water tank 21 to electrolyze an electrolyzed water to generate gas comprising hydrogen, and output the gas comprising hydrogen to the water tank 21. The housing 10 has an accommodating space configured to accommodating the water tank 21, the electrolytic module 22, the integrated passageway device 23, the humidification cup 25, and the nebulizer 28. The internal hydrogen sensing component 12 is configured in the accommodating space for sensing the hydrogen concentration in the hydrogen generator E to generate an internal sensing result. For example, the internal hydrogen sensing component 12 senses the hydrogen concentration near the water tank 21, the electrolytic module 22, the integrated passageway device 23, the humidification cup 25, and the nebulizer 28. In an embodiment, the internal hydrogen sensing component 12 detects the hydrogen concentration in the housing 10 to sense the hydrogen leakage of the water tank 21, the electrolytic module 22, the integrated passageway device 23, the humidification cup 25, and the nebulizer 28. The monitoring device 11 is coupled to the internal hydrogen sensing component 12, wherein the monitoring device 12 controls the operation of the hydrogen generator E according to the internal sensing result.

The integrated passageway device 23 comprises a gas inlet passageway 232 and a gas outlet passageway 233, wherein the integrated passageway device 23 is one-piece formed. The condensate filter 24 is coupled to the integrated passageway device 23 for filtering the gas comprising hydrogen, wherein the integrated passageway device 23 has a space for accommodating the condensate filter 24. The humidification cup 25 is coupled to the integrated passageway device 23 for humidifying the gas comprising hydrogen, wherein the gas comprising hydrogen flows through the condensate filter 24 and the humidification cup 25 by the way of the integrated passageway device 23.

Figure 2:
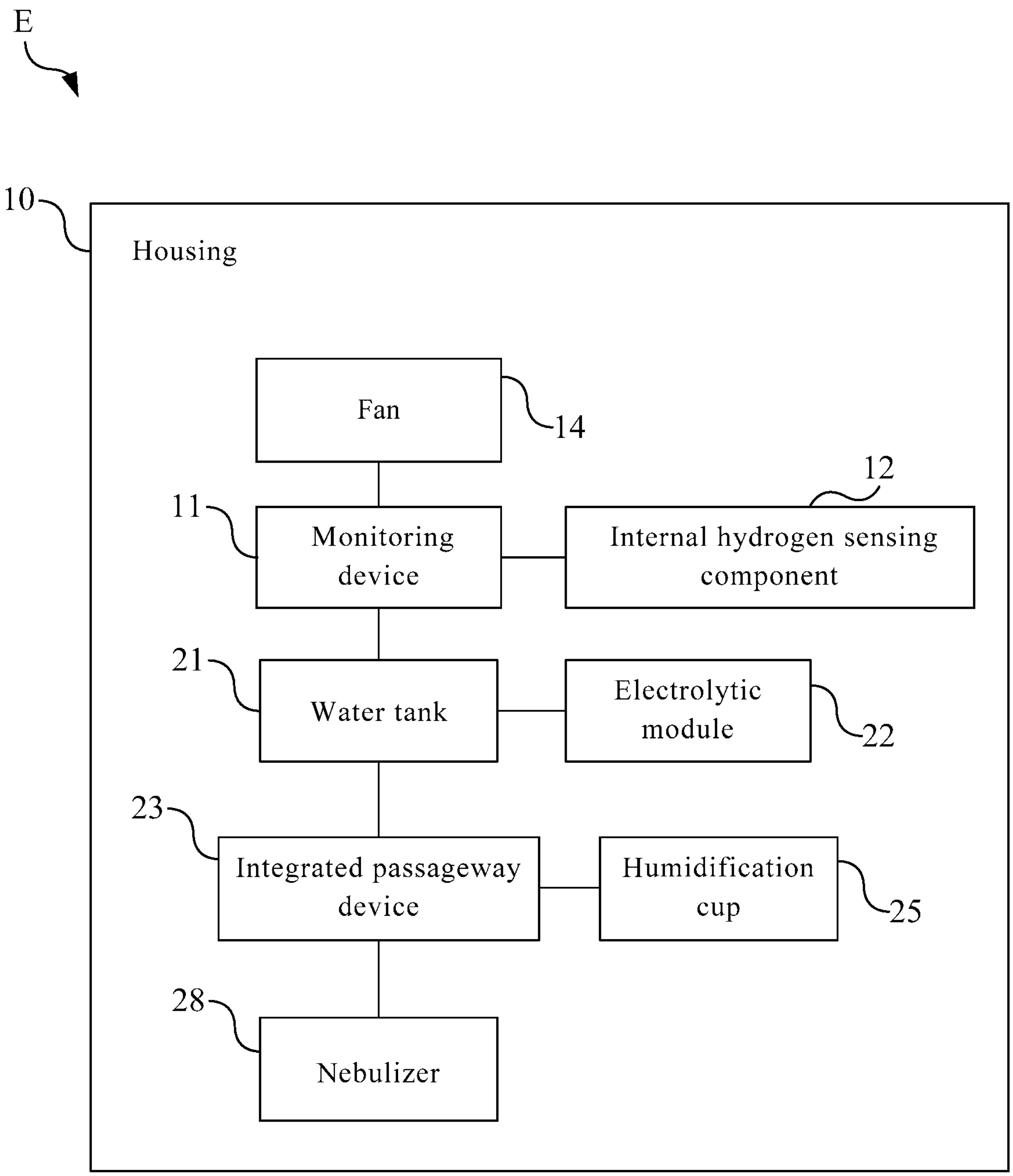
FIG. 2 is a functional block diagram further illustrating the embodiment of FIG. 1.
Figure 3:
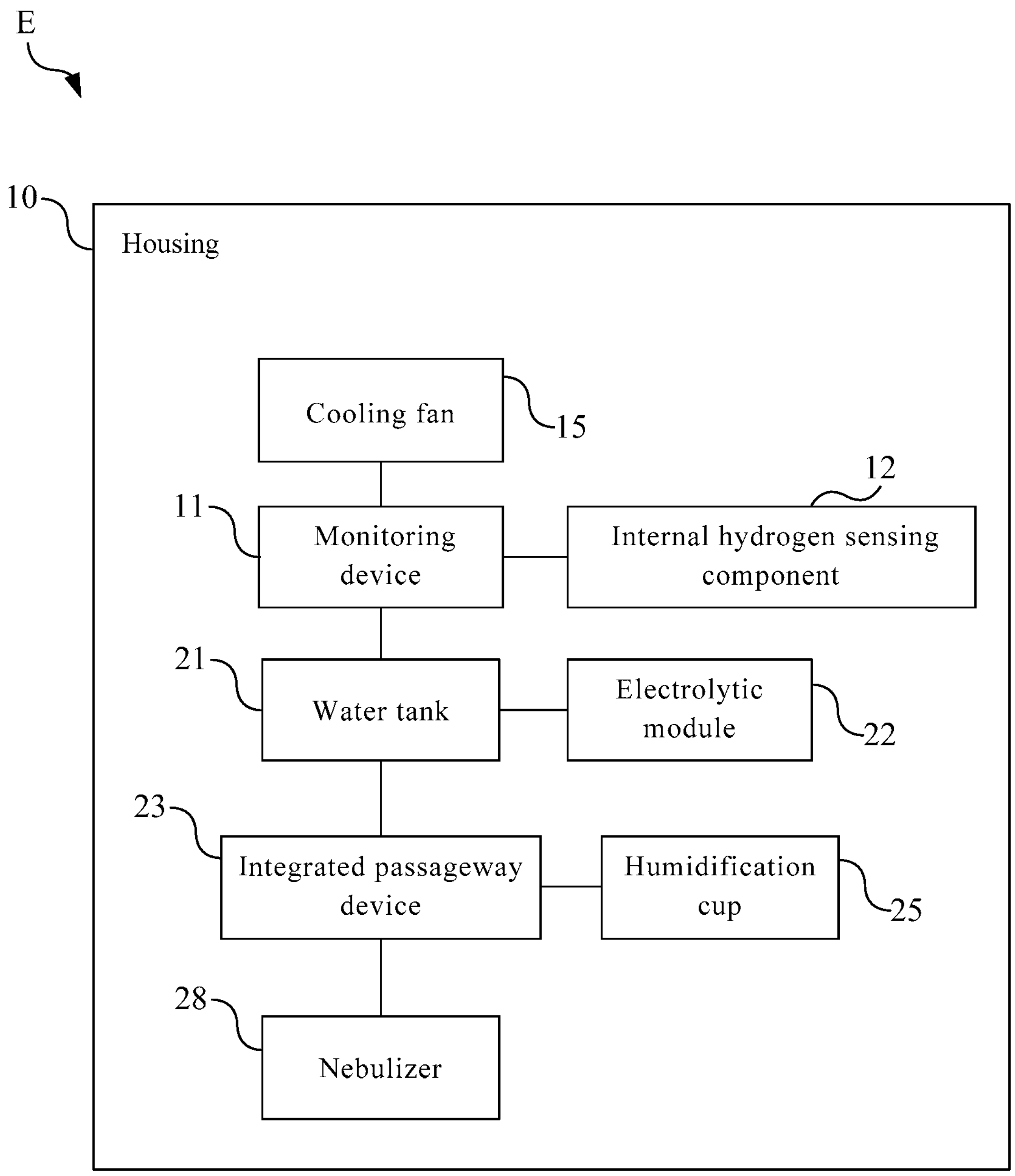
FIG. 3 is a functional block diagram further illustrating the embodiment of FIG. 1.

The way the monitoring device 11 controls the operation of the hydrogen generator E is mainly to control the electrolytic module 22, the fan 14, the cooling fan 15 or a combination of the aforementioned components of the hydrogen generator E. Please refer to FIG. 1 to FIG. 3. FIG. 2 and FIG. 3 are further functional block diagrams according to FIG. 1. As shown in FIG. 1, the monitoring device 11 can be coupled to the electrolytic module 22, and stop the operation of the electrolytic module 22 or reduce the operation efficiency of the electrolytic module 22 according to the internal sensing result. The monitoring device 11 reduces the concentration of gas comprising hydrogen within the housing 10 by reducing or stopping the generation of gas comprising hydrogen. As shown in FIG. 2, the monitoring device 11 can be coupled to the fan 14, which can be used to introduce the gas outside the housing 10 into the accommodating space, thereby diluting the concentration of hydrogen in the housing 10. Wherein, the fan 14 is embedded on the housing 10 or placed in the housing 10. As shown in FIG. 3, the monitoring device 11 is coupled to a cooling fan 15. Wherein, the cooling fan 15 is embedded on the housing 10 or placed in the housing 10. When the hydrogen generator E is in operation, the cooling fan 15 can be used to introduce cold air outside the housing 10 into the accommodating space, so as to achieve the effect of cooling the hydrogen generator E. When the internal hydrogen sensing component 12 senses that the concentration of hydrogen in the housing 10 is abnormal, the monitoring device 11 controls the speed and direction of the cooling fan 15 according to the internal sensing result. Therefore, the monitoring device 11 may increase the speed of the cooling fan 15 to accelerate the dilution of the hydrogen concentration, or directly change the direction of the cooling fan 15 to instead the introduction of external air into the extraction of internal air, thereby reducing the hydrogen concentration in the accommodating space.

The difference between the cooling fan 15 and the fan 14 is that the cooling fan 15 keeps operating without hydrogen leakage. The purpose of its operation is to disperse the heat in the hydrogen generator E. The operation purpose of the fan 14 is to dilute the concentration of hydrogen, so it turns on mainly to operate while the hydrogen leaks. In practice, the monitoring device 11 may control at least one of the electrolytic module 22, the fan 14 and the cooling fan 15, or the monitoring device 11 may simultaneously control at least two of the foregoing. In addition, the monitoring device 11 may also be set to adjust and control different components in different ways to reduce the hydrogen concentration according to the difference in hydrogen concentration.

Figure 4:
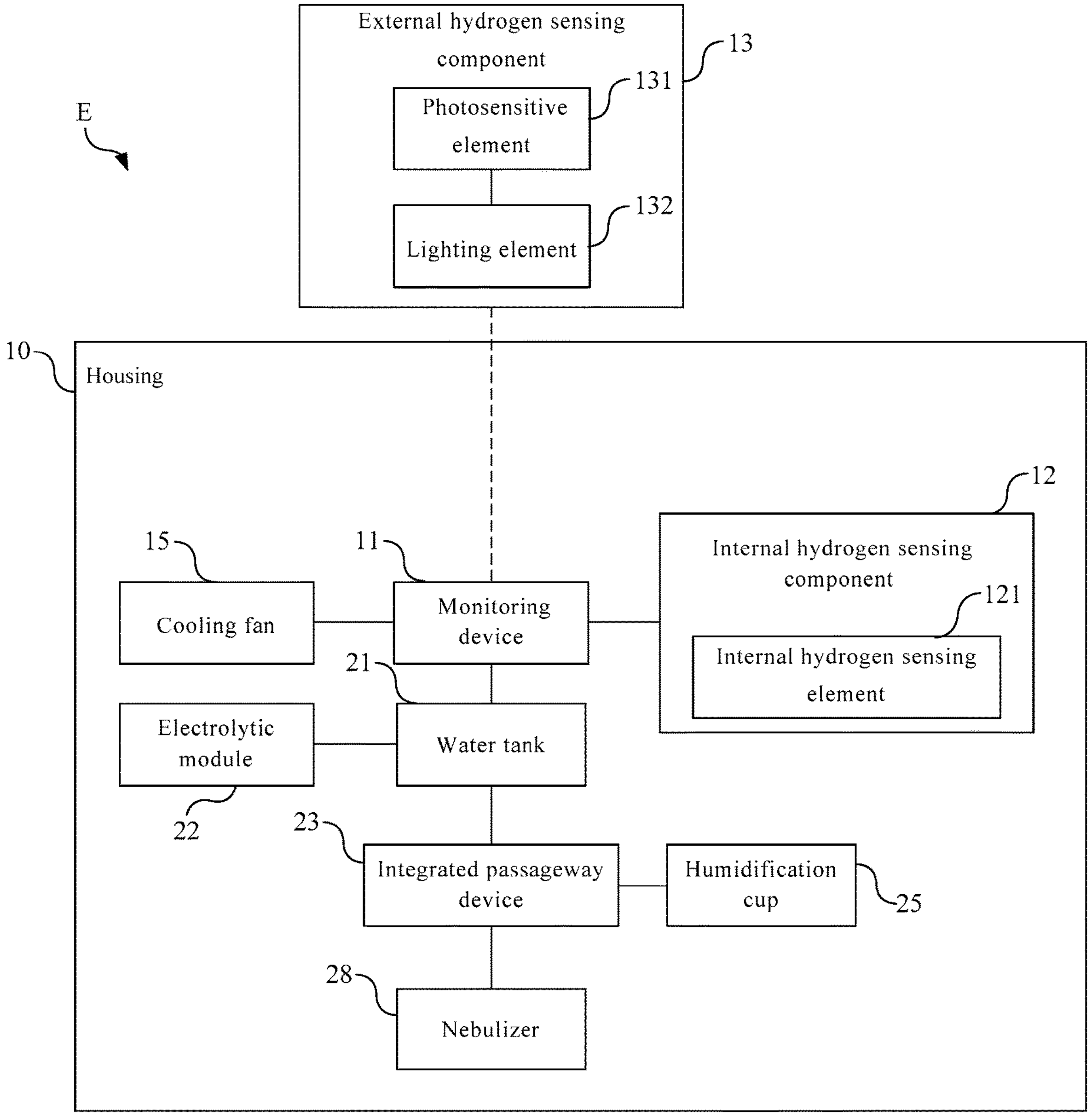
FIG. 4 is a functional block diagram further illustrating the embodiment of FIG. 1.

In addition to monitoring the hydrogen concentration in the accommodating space with the internal hydrogen sensing component 12, the hydrogen generator E of the present invention may use the external hydrogen sensing component 13 to monitor the hydrogen concentration outside the housing 10 to achieve the most complete monitor. Please refer to FIG. 4. FIG. 4 is a functional block diagram further illustrating the embodiment of FIG. 1. As shown in FIG. 4, the hydrogen generator E in the present invention further comprises an external hydrogen sensing component 13 configured outside the housing 10 to communicate with the monitoring device 11. In an embodiment, the external hydrogen sensing component 13 is set on another power socket. The power socket provides power to the external hydrogen sensing component 13. The external hydrogen sensing component 13 is configured to sense the hydrogen concentration outside the housing 10 of the hydrogen generator E to generate an external sensing result. Wherein, the monitoring device 11 controls the operation of the hydrogen generator E according to the external sensing result just like the internal sensing result. The external hydrogen sensing component 13 may include a wireless transmission module (not shown in figure, such as Bluetooth, Wi-Fi and other modules) to communicate with the monitoring device 11 of the hydrogen generator E. In another embodiment, the external hydrogen sensing component 13 may have the power line network transmission module to communicate with the monitoring device 11 of the hydrogen generator E.

In addition to the aforementioned control methods, the monitoring device 11 may further perform different operations according to the internal sensing results and the external sensing results. What needs to be explained here is that the conditions for the internal hydrogen sensing component 12 and the external hydrogen sensing component 13 to generate the internal sensing result and the external sensing result may include the following content. At first, When the hydrogen concentration exceeds the preset standard value or range, the internal sensing result and external sensing result are generated. Second, As long as the hydrogen generator E is operating, the internal sensing result and external sensing result will always be generated. Third, when the hydrogen concentration exceeds the preset standard value or range, the internal hydrogen sensing component 12 and the external hydrogen sensing component 13 will always produce internal sensing results and external sensing results until the hydrogen concentration is lower than the preset standard value or range. The monitoring device 11 may also turn on to control as soon as it receives the internal sensing result and the external sensing result, or the monitoring device 11 may adjust the control items and content according to the hydrogen concentration range of the internal sensing result and the external sensing result.

In an embodiment, when the hydrogen concentration in the machine is higher than the first standard value or within the first standard range, the monitoring device 11 slows down the electrolysis efficiency of the electrolytic module 22 to reduce the generation of hydrogen, and increases the speed of the cooling fan 15 or turns on the fan 14. In another embodiment, the monitoring device 11 turns off the electrolytic module 22 while the hydrogen concentration in the machine is higher than the first standard value or within the first standard range. When the hydrogen concentration in the machine is higher than the second standard value or within the second standard range, the monitoring device 11 turns off the electrolytic module 22 and speeds up the fan 14 or changes the rotation direction of the cooling fan 15. Wherein, the first standard value or the first standard range is lower than the second standard value or the second standard range. In one embodiment, the first standard value may be 2%, and the second standard value may be 4%. The first standard range may be 0.5%-2%, and the second standard range may be 2%-4%, but not limited thereto.

In another specific embodiment, when the hydrogen concentration in the machine is higher than the third standard value or within the third standard range, the monitoring device 11 slows down the operating efficiency of the electrolytic module 22, and increases the speed of the cooling fan 15 or turns on fan 14. When the hydrogen concentration outside the machine is higher than the fourth standard value or within the fourth standard range, the monitoring device 11 turns off the electrolytic module 22 and speeds up the fan 14 or changes the rotation direction of the cooling fan 15. Wherein, when the hydrogen concentration outside the machine could be sensed, it means that the hydrogen concentration inside the machine may be too high. Therefore, the third standard value or the third standard range has to higher than the fourth standard value or the fourth standard range. In one embodiment, the third standard value may be 2%, and the fourth standard value may be 1%. The third standard range may be 1%-2%, and the fourth standard range may be 0.5% to 1%, but not limited thereto.

In addition to adjusting the hydrogen concentration in real time while hydrogen leaks, the hydrogen generator E of the present invention also provides a possible location of the leak. Therefore, the user or maintainer could fix the leakage of the hydrogen generator E as soon as possible. The internal hydrogen sensing component 12 of the present invention has a plurality of internal hydrogen sensing element 121. The monitoring device 11 stores the position information of the corresponding installation position of each internal hydrogen sensing element 121 in the hydrogen generator E. When any internal hydrogen sensing element 121 generates the internal sensing result, the monitoring device 11 can display the location information of the internal hydrogen sensing element 121 that generated the internal sensing result to the user or maintainer know. Wherein, the monitoring device 11 may sort or predict the location of the hydrogen leakage according to the hydrogen concentration in different internal sensing results, or according to the time that the internal sensing results are generated.

Figure 5A:
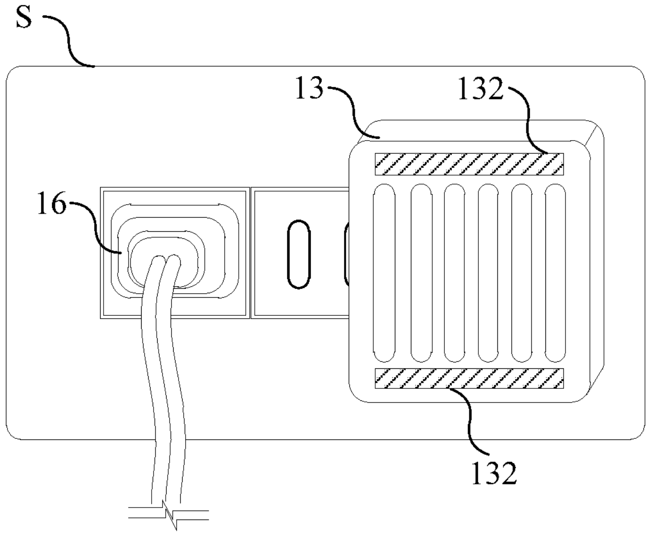
FIGS. 5A and 5B are schematic diagrams illustrating the external hydrogen sensing component.
Figure 5B:
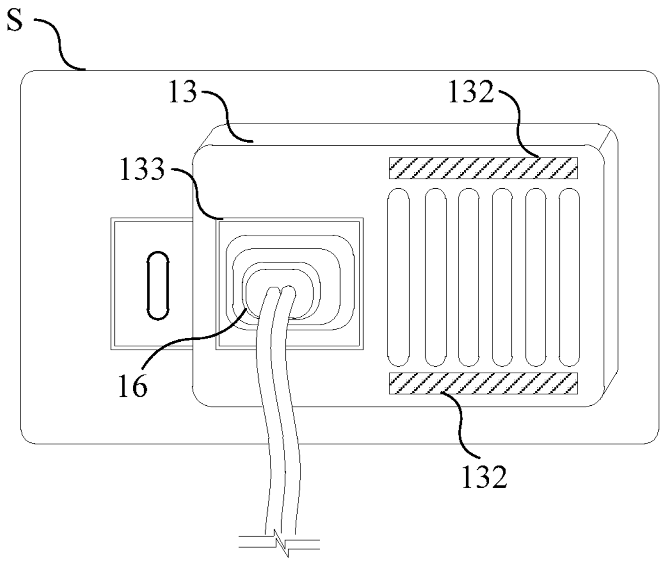

Please refer to FIG. 5A and FIG. 5B together. FIG. 5A and FIG. 5B are schematic diagrams of the external hydrogen sensing component. The external hydrogen sensing component 13 may be arranged as following methods. First, the external hydrogen sensing component 13 is attached to the outside of the housing 10. Second, the external hydrogen sensing component 13 is plug structure (not shown), the external hydrogen sensing component 13 plugs on the power socket S adjacent to the power plug 16 of the hydrogen generator E (as shown in FIG. 5A). Third, the external hydrogen sensing component 13 is a structure with a plug and a socket 133. The structure may be directly plugged into the power socket S. The power plug 16 of the generator E is plugged into the socket 133 of the external hydrogen sensing component 13 (as shown in FIG. 5B). In the third setting mode, the external hydrogen sensing component 13 directly breaks off the power supplied by the power socket S when the hydrogen concentration is too high, so that the hydrogen generator E is directly shut down. In addition, the external hydrogen sensing component 13 can be utilized as a night light. The external hydrogen sensing component 13 includes a photosensitive element 131 and a lighting element 132. The photosensitive element 131 is configured to sense the brightness of the environment, and generate a light-on signal or a light-off signal. The lighting element 132 is coupled to the photosensitive element 131 and can be used to turn on the lighting function according to the light-on signal, or turn off the lighting function according to the light-off signal. Wherein, when the brightness of the environment is lower than the brightness threshold value, the photosensitive element 131 generates a light-on signal, and the lighting element 132 turns on the lighting function according to the light-on signal. When the brightness of the environment is higher than the brightness threshold value, the light-sensitive element 131 generates a light-off signal, and the lighting element 132 turns off the lighting function according to the light-off signal. In another embodiment, the external hydrogen sensing component 13 is plugged into the power socket S, and the power plug 16 of the hydrogen generator E may be plugged into another power socket. There is an appropriate distance between the power socket S and another power socket.

Figure 6:
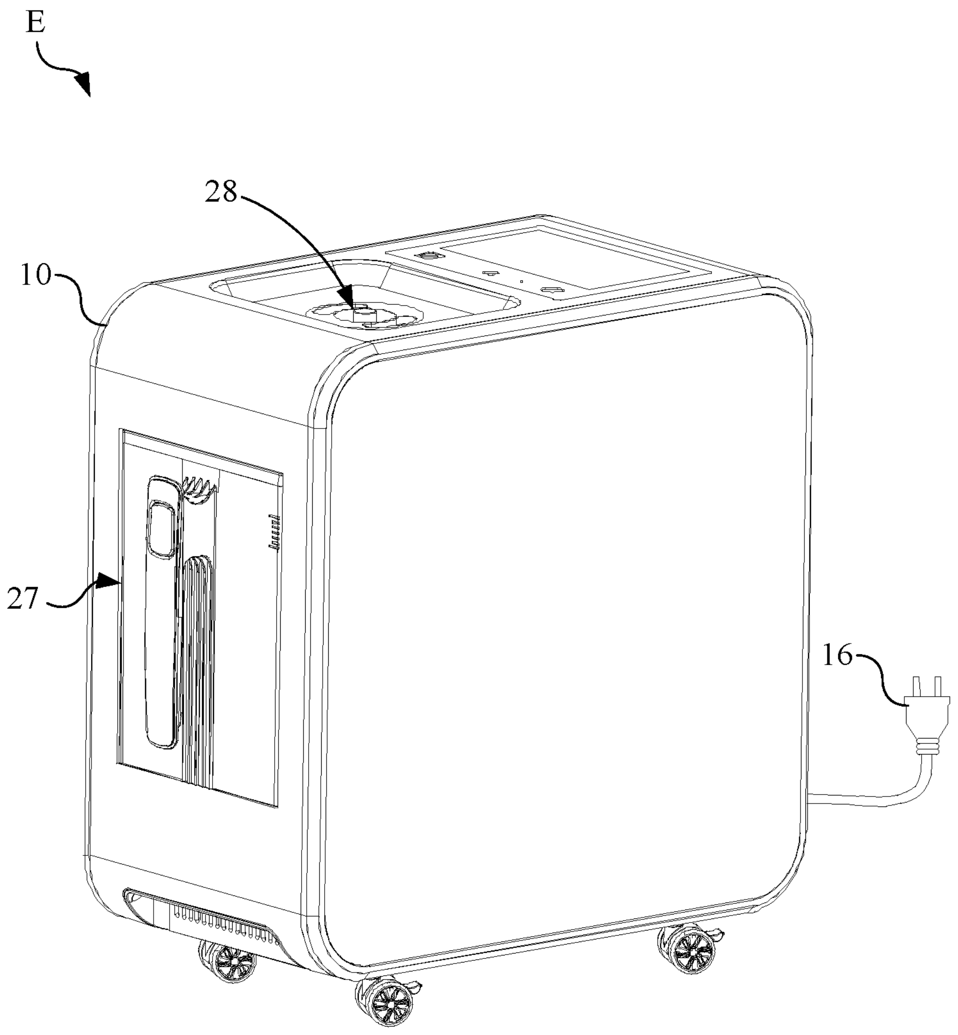
FIG. 6 is an appearance diagram illustrating a hydrogen generator with hydrogen leakage self-aware function according to an embodiment of the present invention.
Figure 7A:
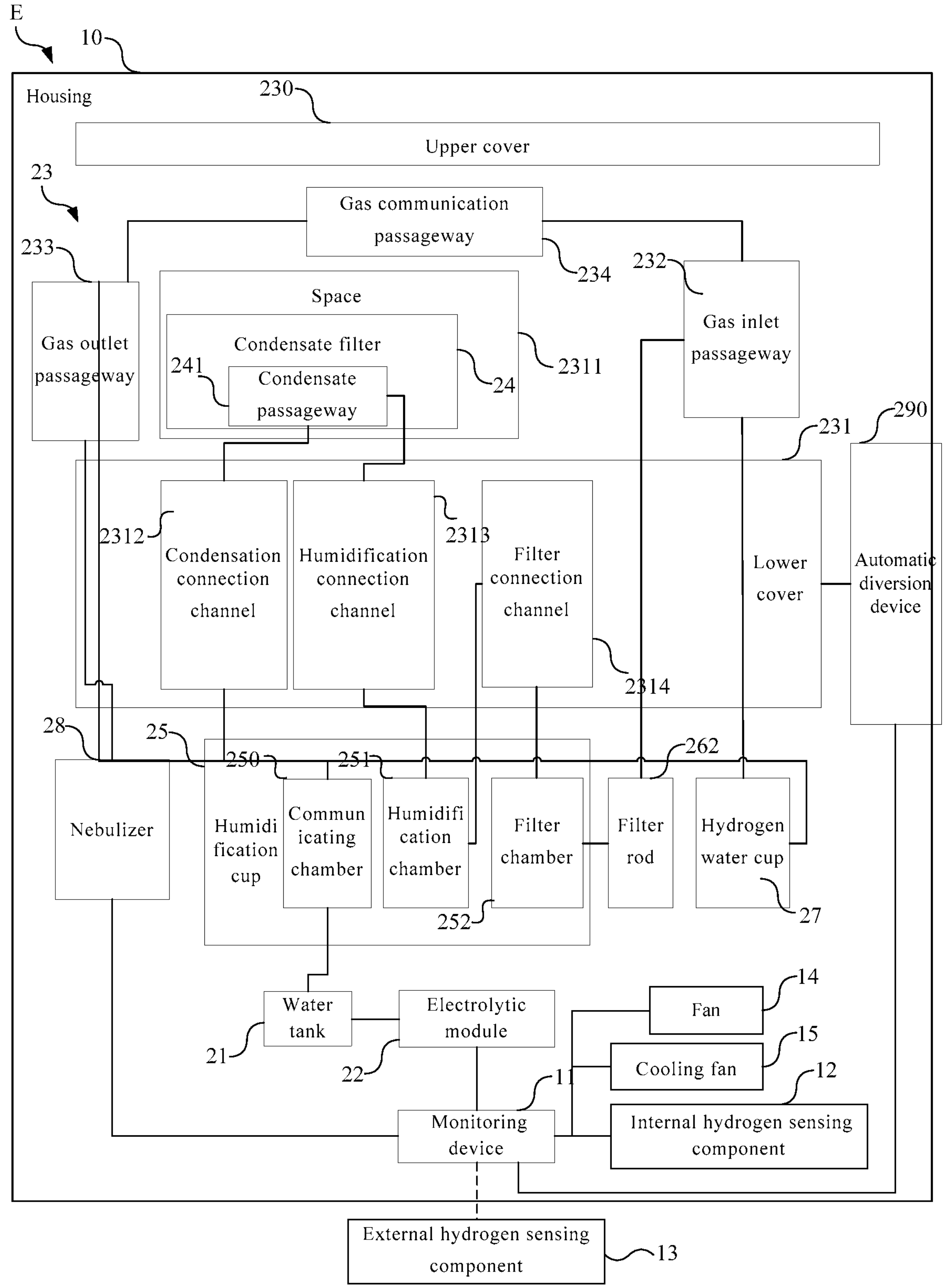
FIG. 7A is a functional block diagram illustrating a hydrogen generator with hydrogen leakage self-aware function according to an embodiment of the present invention.
Figure 7B:
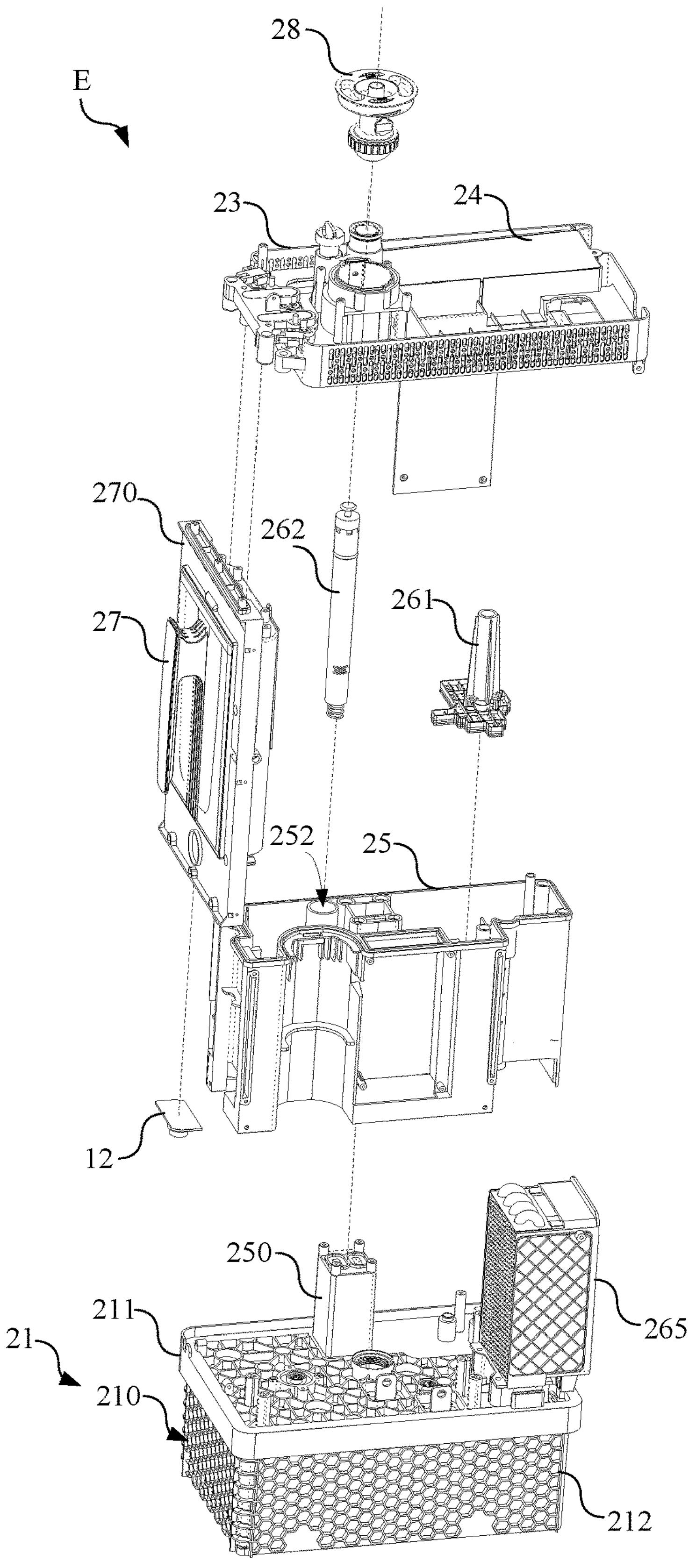
FIG. 7B is an exploded diagram illustrating the hydrogen generator according to the embodiment of FIG. 7A.
Figure 8A:
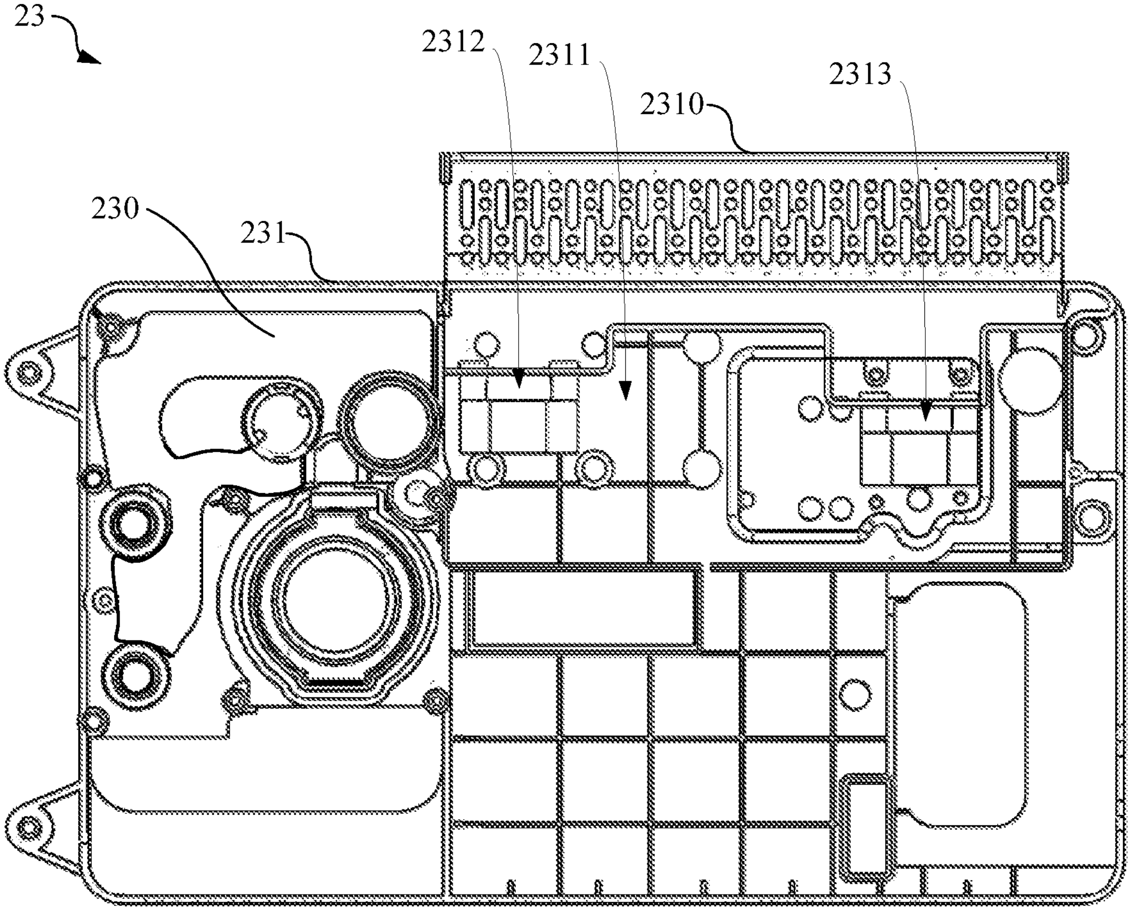
FIG. 8A is a top view of the integrated passageway device according to the embodiment of FIG. 7B.
Figure 8B:
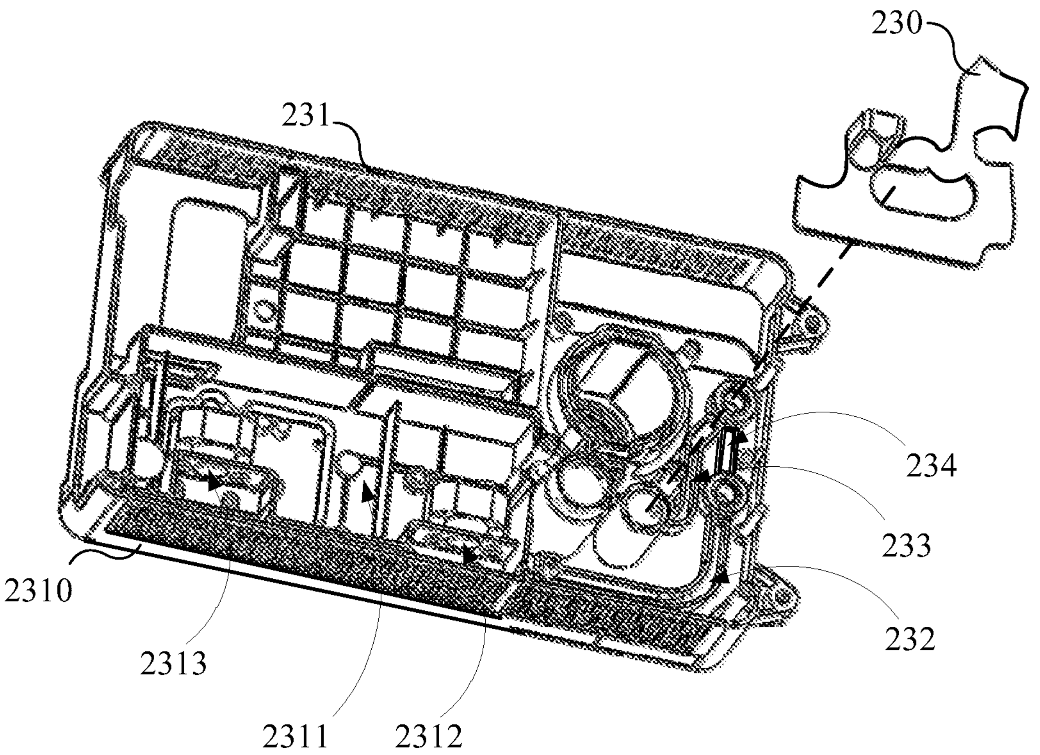
FIG. 8B is an exploded diagram illustrating the integrated passageway device according to the embodiment of FIG. 8A.

Please refer to FIG. 6, FIG. 7A, FIG. 7B, FIG. 8A and FIG. 8B. FIG. 6 is an appearance diagram illustrating a hydrogen generator with hydrogen leakage self-aware function according to an embodiment of the present invention. FIG. 7A is a functional block diagram illustrating a hydrogen generator E with hydrogen leakage self-aware function according to an embodiment of the present invention. FIG. 7B is an exploded diagram illustrating the hydrogen generator E according to the embodiment of FIG. 7A. FIG. 8A is a top view of the integrated passageway device 23 according to the embodiment of FIG. 7B. FIG. 8B is an exploded diagram illustrating the integrated passageway device 23 according to the embodiment of FIG. 8A. As shown in FIG. 7A & FIG. 7B, the hydrogen generator E includes an electrolytic module 22, a water tank 21, an integrated passageway device 23, a humidification cup 25, a condensate filter 24, a filter rod 262, a nebulizer 28, a hydrogen water cup 27 and a frame 270 for fixing the hydrogen water cup 27. The electrolytic module 22 is set in the water tank 21. The water tank 21 includes a water tank body 210 and a water tank upper cover 211. The water tank body 210 and the water tank upper cover 211 can be provided with a plurality of honeycomb structures (as shown) or rib structures to strengthen the hardness of the water tank body 210. The humidification cup 25 and the condensate filter 24 can be stacked on the water tank 21. For example, the humidification cup 25 is stacked vertically on the water tank 21, then the integrated passageway device 23 is vertically stacked on the humidification cup 25, and finally the condensate filter 24 is placed in the accommodation space inside the integrated passageway device 23. The electrolytic module 22 is used to electrolyze electrolyzed water to generate gas comprising hydrogen. The gas comprising hydrogen may contain part of hydrogen and part of oxygen (such as about 66% hydrogen and about 33% oxygen). In another embodiment, the gas comprising hydrogen may include 100% hydrogen. The water tank 21 is used to accommodate the electrolyzed water and receive the gas comprising hydrogen output from the electrolytic module 22. As shown in FIG. 8A and FIG. 8B, the integrated passageway device 23 comprises an upper cover 230 and a lower cover 231. The integrated passageway device 23 has a gas inlet passageway 232, a gas outlet passageway 233, and a gas communication passageway 234. The gas inlet passageway 232, the gas outlet passageway 233, and the gas communication passageway 234 are located between the upper cover 230 and the lower cover 231. The lower cover 231 is an integral formed structure. Wherein, the integrated formed structure can be recognized as a structure formed by injection molding, or a structure formed by welding and combining different components into one piece. In practice, the integrated passageway device 23 is stacked above the humidification cup 25, and the humidification cup 25 is stacked above the water tank 21 as shown in FIG. 7A, FIG. 7B, FIG. 8A and FIG. 8B.

Figure 9:
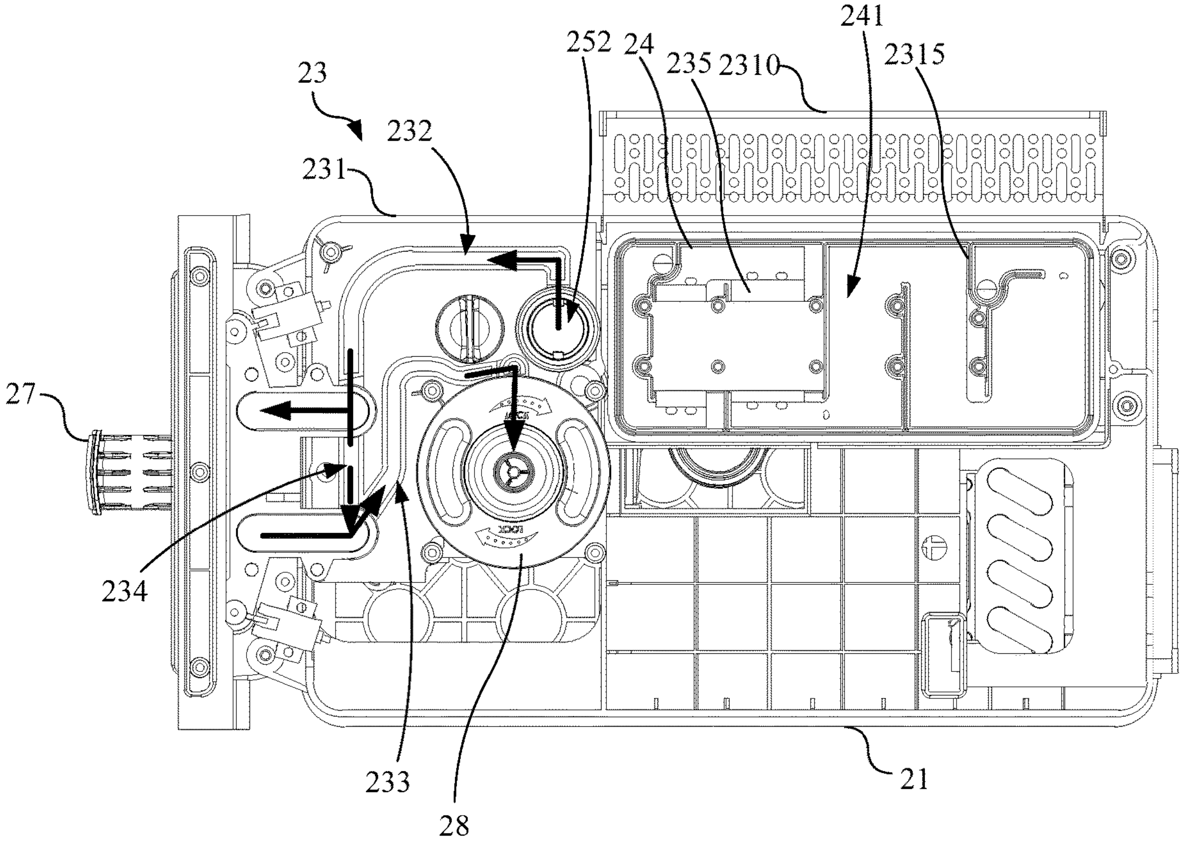
FIG. 9 is a top view of the hydrogen generator according to the embodiment of FIG. 7B.

Please refer to FIG. 9, FIG. 9 is a top view of the hydrogen generator E according to the embodiment of FIG. 7B. The lower cover 231 has a space 2311 configured for accommodating the condensate filter 24. The humidification cup 25 is stacked between the integrated passageway device 23 and the water tank 21 and is embed or coupled to the lower cover 231. The condensate filter 24 is used to condense and filter the gas comprising hydrogen. The condensate filter 24 has a condensate passageway 241. In practice, the condensate filter 24 can be moveably embedded into the integrated passageway device 23 for easy replacement from the side of the integrated passageway device 23. The filter rod 262 is embed into the lower cover 231 and is configured to filter the gas comprising hydrogen. The nebulizer 28 is embedded into the lower cover 231 and coupled to the gas outlet passageway 233 to receive the gas comprising hydrogen. The nebulizer 28 further generates atomized gas and mix the atomized gas with the gas comprising hydrogen to form healthy gas. The hydrogen water cup 27 can be used to accommodate drinking water and inject the gas comprising hydrogen into the drinking water to form hydrogen water. In practice, the hydrogen water cup 27 can be embedded into the frame 270 to be coupled (or directly connected) to the integrated passageway device 23. When the hydrogen water cup 27 is detached from the frame 270 and not coupled with the integrated passageway device 23, the electrolytic module 22 turns off and the screen of the hydrogen generator E displays the warning message. Wherein, the gas inlet passageway 232 and the gas outlet passageway 233 are selectively coupled to the hydrogen water cup 27, and the gas communication passageway 234 is selectively coupled to the gas inlet passageway 232 and the gas outlet passageway 233.

Therefore, the gas comprising hydrogen can be transferred among the humidification cup 25, the condensate filter 24, the filter rod 262, the nebulizer 28, and hydrogen water cup 27. Therefore, the gas flow channels of the entire hydrogen generator can be reduced, and at the same time reduce or remove the connecting air pipes with both ends to connect different modules, thereby reducing the probability of hydrogen leakage. On the other hand, in an embodiment, the humidification cup 25, the condensate filter 24, the filter rod 262, the nebulizer 28 and the hydrogen water cup 27 are embedded or directly coupled to the integrated passageway device 23. The humidification cup 25, the condensate filter 24 and the nebulizer 28 can be directly coupled to the lower cover 231, and further, the hydrogen water cup 27 can also be directly coupled to the lower cover 231.

In one embodiment, the electrolytic module 22 can be accommodated in the water tank 21, and the electrolytic module 22 can receive water in the water tank 21 to electrolyze water for generating the gas comprising hydrogen. After the electrolytic module 22 electrolyzing water, the electrolytic module 22 directly generates the gas comprising hydrogen in the water tank 21. In practice, the outer layer of the water tank 21 has a honeycomb structure 212 for increasing the rigidity of the water tank 21 to prevent the water tank 21 from being deformed by the gas comprising hydrogen. Besides, since the honeycomb structure 212 increases the rigidity of the water tank 21, the gas comprising hydrogen tends to move to the communicating chamber 250 instead of staying in the water tank 21.

The humidification cup 25 comprises a humidification chamber 251, a communicating chamber 250, and a filter chamber 252. The humidification chamber 251 accommodates supplementary water to humidify the gas comprising hydrogen. The communicating chamber 250 is used to couple the water tank 21 with the integrated passageway device 23 for the gas comprising hydrogen to flow into the condensate passageway 241. In the present embodiment, the humidification cup 25 is provided with a miniaturization device 261, and the bottom of the miniaturization device 261 contains a flat part with a plurality of fine holes. When the gas comprising hydrogen enters the miniaturization device 261, it flows into the humidification chamber 251 through a plurality of fine holes. The filter chamber 252 accommodates the filter rod 262 so that the filter rod 262 filters the gas comprising hydrogen. Wherein, the communicating chamber 250 is not communication with the humidification chamber 251 in direct. In addition, the lower cover 231 of the integrated passageway device 23 further has a condensation connection channel 2312, a humidification connection channel 2313 and a filter connection channel 2314. The condensation connection channel 2312 is used to communicate with water tank 21 and condensate filter 24 through communicating chamber 250. The humidification connection channel 2313 is used to communicate condensate filter 24 (or condensate passageway 241) and humidification chamber 251. The filter connection channel 2314 is used to communicate the humidification chamber 251 and the filter chamber 252. The filter rod 262 is disposed in the filter chamber 252 and coupled to the gas inlet passageway 232 to output the filtered gas comprising hydrogen. The filter rod 262 is removably disposed in the filter chamber 252.

Figure 10:
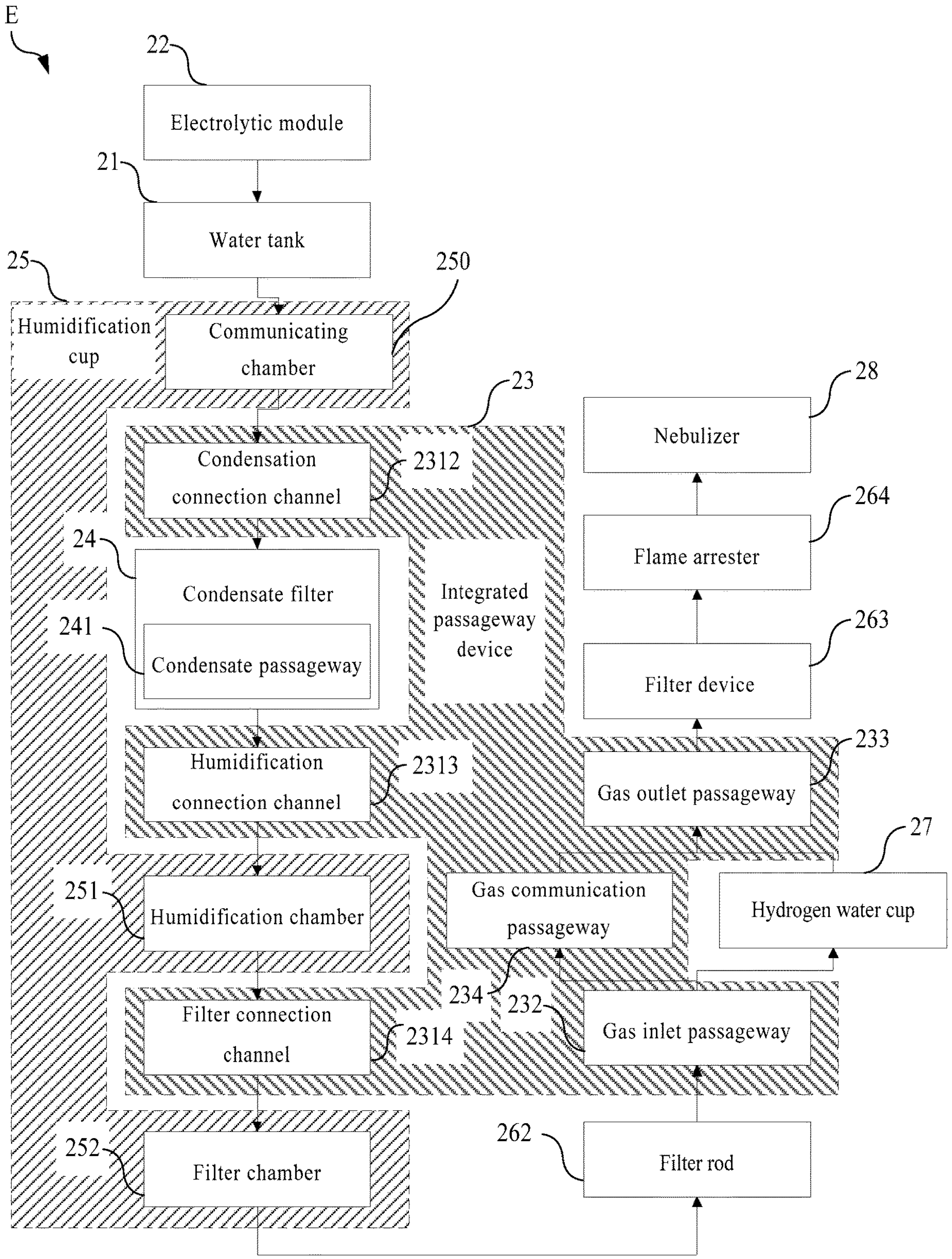
FIG. 10 is a schematic diagrams illustrating the flow direction of the gas comprising hydrogen in the hydrogen generator according to the embodiment of FIG. 7A.

In detail, the hydrogen generator E of the present invention has a gas path as shown in FIG. 7A through stacking and fitting the integrated passageway device 23 and other components, so that the gas comprising hydrogen can flow therein. To illustrate the flow direction of the gas comprising hydrogen clearly, please refer to FIG. 10. FIG. 10 is a schematic diagram illustrating the flow direction of the gas comprising hydrogen in the hydrogen generator E according to the embodiment of FIG. 7A. As shown in FIG. 10, the electrolytic module 22 electrolyzes water to generate gas comprising hydrogen, and the gas comprising hydrogen is outputted and accommodated into the water tank 21 because the electrolytic module 22 is configured in the water tank 21. In order to reduce the airway space of the entire hydrogen generator E, the water level of the water tank 21 is approximately close to the full water level, for example, close to 90%-99% of the water tank body 210. Therefore, once the gas comprises hydrogen leaves the water of the water tank 21, it will quickly enter the communicating chamber 250 of the humidification cup 25.

Next, the gas comprising hydrogen flows through the communicating room 250 of the humidification cup 25, the condensation connection channel 2312 of the integrated passageway device 23, the condensate passageway 241 of the condensate filter 24, the humidification connection channel 2313 of the integrated passageway device 23, the humidification chamber 251 of the condensate filter 25, the filter connection channel 2314 of the integrated passageway device 23, the filter rod 262 of the humidification chamber 251 of the humidification cup 25, the gas inlet passageway 232 of the integrated passageway device 23, the gas outlet passageway 233 of the integrated passageway device 23, a flame arrester 264, and the nebulizer 28 in sequence.

Wherein, the gas comprising hydrogen can selectively flow through the hydrogen water cup 27. However, it should be noted that the above-mentioned flow direction of the gas comprising hydrogen is one of the embodiments of the hydrogen generator E of the present invention, and those skilled in the art can adjust the arrangement order of each element based on their requirements.

The humidification cup 25, condensate filter 24, filter rod 262, nebulizer 28 and hydrogen water cup 27 are snapped, fitted or directly coupled to the integrated passageway device 23, the gas comprising hydrogen passes through the condensate filter 24, the humidification cup 25, the filter rod 262, the hydrogen water cup 27 and the nebulizer 28 via the integrated passageway device 23. Moreover, the water level of the water tank 21 is approximately close to the full water level. Therefore, the gas channel of the entire hydrogen generator E is not much, and the storage of the gas comprising hydrogen in the hydrogen generator E can be limited, thereby reducing the probability and damage of hydrogen explosion. Of course, the gas comprising hydrogen is transported between the condensate filter 24, the humidification cup 25, the filter rod 262, the hydrogen water cup 27 and the nebulizer 28 through the integrated passageway device 23. In other embodiments, the flow sequence is not limited to the above. For example, the filter rod 262 can be placed between the hydrogen water cup 27 and the nebulizer 28, so the gas comprising hydrogen is sequentially delivered to the condensate filter 24, the humidification cup 25, the hydrogen water cup 27, the filter rod 262 and the nebulizer 28 through the integrated passageway device 23. Otherwise, the gas comprising hydrogen is sequentially transported to the humidification cup 25, condensate filter 24, the filter rod 262, the hydrogen water cup 27 and the nebulizer 28.

In one embodiment, the hydrogen generator E further comprises a filter device 263 configured to filter microorganisms in the gas comprising hydrogen or to kill bacteria in the gas comprising hydrogen. The filter device 263 may contain at least one of activated carbon, nano-silver sputtering, polyethylene terephthalate (PET), or polypropylene (PP) fiber. The bacterial types may include *Staphylococcus aureus, Escherichia coli, Pseudomonas aeruginosa*, drug-resistant *Staphylococcus aureus*, etc. It should be noted that those skilled in the art can add multiple filter devices 263 and adjust their setting positions according to their requirements, but it is not limited to this. The filter device 263 can be arranged before the flame arrester 264 (as shown in FIG. 7A), or be arranged in the nebulizer 28 or the outlet of the nebulizer 28 as a replacement unit.

In one embodiment, the flame arrester 264 comprises at least one of a metal mesh filter core and a corrugated filter core. The metal mesh filter core can be a structure composed of multi-layer stainless steel mesh or copper mesh, with a diameter of 0.23 to 0.315 mm. The corrugated filter core can be supported by stainless steel, cupro-nickel alloy, aluminum, or aluminum alloy to prevent the violent flame of deflagration and withstand the corresponding mechanical and thermal effects. The flame arrester 264 is used to block the flame from flowing through the flame arrester 264, thereby isolating two spaces from each other. Therefore, the flame arrester 264 can prevent the fire from spreading from one side to the other side of the flame arrester 94, thereby preventing the fire from spreading through the gas channel and causing an explosion. In one embodiment, the flame arrester 264 is configured between the nebulizer 28 and the gas outlet passageway 36.

In addition to use the flame arrester 264, the hydrogen generator E of the present invention can also use the supplementary water in the humidification chamber 251 and the water in the water tank 21 to achieve multi-zone fire prevention and prevent fire from spreading. In details, the hydrogen generator E can be divided into three regions (the water tank 21 to the humidification chamber 251, the humidification chamber 251 to the flame arrester 264, and the flame arrester 264 to the nebulizer 28 (even to the user end) by water (supplementary water and electrolyzed water).

When a flame enters into the hydrogen generator E from the nebulizer 28 side, the flame will be blocked by the flame arrester 264. When a flame occurs in the gas channel between the humidification chamber 251 and the flame arrester 264, the supplementary water in the humidification chamber 251 and the flame arrester 264 will block the flame. When a flame occurs in the electrolytic module 22, the electrolyzed water in the water tank 21 will block the flame.

In addition to achieving interval-type fire protection, stage-type fire protection also can be achieved. For example, if the flame arrester 264 cannot block a flame when the flame enters into the hydrogen generator E from the nebulizer 28 side, the supplementary water in the humidification chamber 251 can be used as a second flame arrest. Therefore, the safety of the hydrogen generator E can be sufficiently improved. It should be noted that those skilled in the art might add a plurality of flame arresters 264 and adjust their setting positions to achieve more interval-type and more stage-type fire arresters according to their requirements, which is not limited to this.

In an embodiment, when the gas comprising hydrogen is sequentially delivered between the condensate filter 24, the humidification cup 25, the hydrogen water cup 27, the filter rod 262 and the nebulizer 28, the flame arrester 264 is arranged between the filter rod 262 and the nebulizer 28. The flame arrester 264 can be arranged at the outlet of the filter rod 262 and belongs to a part of the filter rod 262, which is convenient for replacing the filter rod 262 together; or the flame arrester can be arranged at the entrance of the nebulizer 28.

Please refer to FIG. 9 again. As shown in FIG. 9, in order to show the inside of the condensate filter 24, the gas inlet passageway 232, the gas outlet passageway 233, and the gas communication passageway 234 clearly, the cover of the condensation filter 24 and the upper cover 230 of the integrated passageway device 23 are hidden. The relative positions of the filter chamber 252, the gas inlet passageway 232, the gas communication passageway 234, the hydrogen water cup 27, the gas outlet passageway 233, and the nebulizer 28 can be recognized in FIG. 9. The flow direction of the gas comprising hydrogen is indicated by solid arrows and dashed arrows. Under the normal operation mode, the gas comprising hydrogen arrives to the nebulizer 28 through the filter chamber 252, the gas inlet passageway 232, the hydrogen water cup 27, and the gas outlet passageway 233 sequentially. The gas comprising hydrogen will be injected into the drinking water in the hydrogen water cup 27 to form hydrogen water while the gas comprising hydrogen flows through the hydrogen water cup 27. The gas comprising hydrogen flows through the hydrogen water cup 27 to generate bubbles with noise generated. Take this into consideration, the gas comprising hydrogen also enters the gas outlet passageway 233 from the gas inlet passageway 232 through the gas communication passageway 234 along the direction of the dotted arrow, and the gas comprising hydrogen flows without entering the hydrogen water cup 27. At this time, the noise with bubbles caused by the gas comprising hydrogen flowing through the hydrogen water cup 27 is avoided. Therefore, the gas comprising hydrogen can selectively flow through the hydrogen water cup 27.

The condensate passageway 241 of the condensate filter 24 is formed by a plurality of spacers 2315. The condensate passageway 241 can accommodate the filter pad 235, and the filter pad 235 can be at least one of steel wool and polyester synthetic cotton. The filter pad 235 is used to filter impurities in the gas comprising hydrogen, such as electrolyte or alkali mist. A cooling fin (not shown in figures) can be provided above the filter pad 235. When the filter pad 235 is attached to the cooling fin closely, the filter pad 235 can transfer the thermal energy in the gas comprising hydrogen to the outside, thereby enhancing the condensation effect. In practice, the filter pad 235 can be an integrally formed structure, and the filter pad 235 has a plurality of holes corresponding to the positions of the spacers 2315. When the filter pad 235 is coupled to the condensate passageway 241, the filter pad 235 can be directly coupled to the corresponding spacer 2315 to improve the tightness between the condensate passageway 241 and the filter pad 235. Therefore, it can be ensured that the gas comprising hydrogen flowing through the condensate passageway 241 can be filtered and condensed.

The filter pad 235 may comprise multiple pieces of fiber cotton as a separate structure, or the can filter pad 235 may be a combination structure composed of at least one piece of steel wool and at least one piece of fiber cotton. The filter pad 235 can be used to initially filter initially the impurities in the gas comprising hydrogen. Wherein, the aforementioned spacer 2315 may be used to separate a plurality of filter pad 235 to prevent the filter pad 235 from overlapping with each other or prevent them from contacting each other and absorbing moisture from each other to reduce the effect of condensation and moisture absorption.

The lower cover 231 of the integrated passageway device 23 has a movable flip structure 310 for forming a side structure surrounding the space 3211. The condensate filter 24 is placed in the space 3211 through the movable flip structure 310, so that the condensate filter 24 can be selectively engaged with the lower cover 231. Therefore, the user can easily replace the condensate filter 24 located in the space 3211 by opening and closing the movable flip structure 310.

In practical, the nebulizer 28 further includes an atomization mixing chamber and an vibrator. The atomization mixing chamber can be used to carry the precursor of the atomized gas, and mix the atomized gas with the gas comprises hydrogen to form health care gas. The vibrator is configured under the atomization mixing chamber for vibrating and atomizing the aforementioned precursor, so that the precursor is atomized into the required atomizing gas. The atomized gas contains at least one of water vapor, atomized potion and volatile essential oil.

In practical applications, please refer to FIG. 7B again. The hydrogen generator E with hydrogen leakage self-aware function further includes a radiator 265. The radiator 265 is coupled to the water tank 21, and the radiator 265 includes a column structure, a plurality of cooling fins and a spiral structure. The water tank 21 has a water storage space, and the pipe column structure is configured outside the water storage space. The column structure has a water pipe inlet and a water pipe outlet connected to the water storage space to receive and output the electrolyzed water. Wherein, the column structure runs through a plurality of cooling fins, and the spiral structure is configured in the column structure. The electrolytic module 22 is configured in the water tank 21 and connected to the water storage space, and can be used for electrolysis of electrolyzed water to generate gas comprising hydrogen. Wherein, the upper cover 211 of the water tank 21 is combined with the water tank body 210 to form a water storage space for accommodating electrolyzed water. The radiator 265 further includes a base. The base is located on the upper cover 211 of the water tank 21, and the base has a water inlet and a water outlet communicating with the water storage space. The column structure may be coupled to the base, the water pipe inlet is connected to the water storage space through the water inlet, and the water pipe outlet is connected to the water storage space through the water outlet to receive and output the electrolyzed water. In a embodiment, the upper cover 211 of the water tank 21 and the base may be one-piece formed.

In another embodiment, the hydrogen generator E with hydrogen leakage self-aware function includes: an electrolytic module 22, an integrated passageway device 23, an nebulizer 28, a housing 10, an internal hydrogen sensing component 12, a machine, an external hydrogen sensing component 13 and a monitoring device 11. The electrolytic module 22 is configured to electrolyze electrolyzed water to generate gas comprising hydrogen. The integrated passageway device 23 is coupled to the electrolytic module 22, and the integrated passageway device 23 has an nebulizer accommodating space. The nebulizer 28 is coupled to the integrated passageway device 23 and accommodated in the atomizer accommodating space for receiving the gas comprising hydrogen and generating atomized gas for mixing with the gas comprising hydrogen to form health care gas. The housing 10 has an accommodating space for accommodating the electrolytic module 22, the integrated passageway device 23 and the nebulizer 28. The internal hydrogen sensing component 12 is configured in the accommodating space for sensing the hydrogen concentration outside the electrolytic module 22, the integrated passageway device 23 and the nebulizer 28 to generate an internal machine sensing result. The external hydrogen sensing component 13 is configured outside the housing 10 for sensing the concentration of hydrogen outside the housing 10 to generate an external sensing result. The monitoring device 11 is coupled to the internal hydrogen sensing component 12 and the external hydrogen sensing component 13, and the monitoring device 11 controls the operation of the hydrogen generator E according to at least one of the internal sensing results and the external sensing results. The actions and functions of the components mentioned in this embodiment are the same as those in the previous embodiments, and no longer repeated here.

Compared with the prior art, the hydrogen generator E of the present invention has an internal hydrogen sensing component 12. When there is a problem of hydrogen gas leakage in the housing 10, the internal hydrogen sensing component 12 will send out the internal sensing result. The monitoring device 11 controls the operation of the hydrogen generator E according to the internal sensing results. The control procedure of the monitoring device 11 includes following of 1) Controlling the electrolytic module 22 to slow down or turn off, so as to reduce the amount or concentration of hydrogen gas generated, thereby avoiding the continuous increase of the concentration of hydrogen gas leakage. 2) Control the fan 14 to lead external air into the housing 10, to reduce the concentration of hydrogen in the housing 10. 3) Regulate the cooling fan 15. In addition to introducing external air, the present invention may also directly change the rotation direction of the cooling fan 15 to directly draw out the internal hydrogen to quickly reduce the hydrogen concentration. In addition to the internal hydrogen sensing component 12, the hydrogen generator E of the present invention may further include an external hydrogen sensing component 13 to control the hydrogen concentration inside and outside the housing 10 ideally. Since the hydrogen generator of the present invention has the hydrogen leakage self-aware function, which avoids hydrogen explosion during the use of the hydrogen generator, so that the users can use it without worry.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the meet's and bounds of the appended claims.

What is claimed is:

1. A hydrogen generator with hydrogen leakage self-aware function, comprising:
- an electrolytic module configured to electrolyze an electrolyzed water to generate gas comprising hydrogen;
- an integrated passageway device comprising a gas inlet passageway and a gas outlet passageway, wherein the integrated passageway device is one-piece formed;
- a condensate filter coupled to the integrated passageway device for filtering the gas comprising hydrogen, wherein the integrated passageway device has a space for accommodating the condensate filter;

a humidification cup coupled to the integrated passageway device for humidifying the gas comprising hydrogen, wherein the gas comprising hydrogen flows through the condensate filter and the humidification cup by the way of the integrated passageway device;

a housing configured to accommodating the electrolytic module, the integrated passageway device, the humidification cup, and the condensate filter;

an internal hydrogen sensing component configured in the housing for sensing the hydrogen concentration in the housing to generate an internal sensing result; and a monitoring device coupled to the internal hydrogen sensing component, wherein the monitoring device controls the operation of the hydrogen generator according to the internal sensing result.

2. The hydrogen generator of claim 1, wherein the monitoring device is coupled to the electrolytic module, the monitoring device turns off or reduces the operating efficiency of the electrolytic module according to the internal sensing result, wherein the sensed hydrogen concentration is caused by a hydrogen leakage within the hydrogen generator.

3. The hydrogen generator of claim 1, further comprising:

a fan embedded in the housing and coupled to the monitoring device, wherein the fan is configured to import air outside the housing into the accommodating space;

wherein, the monitoring device controls the fan according to the internal sensing result to import the air outside the housing into the housing.

4. The hydrogen generator of claim 1, further comprising:

an external hydrogen sensing component configured outside the housing to communicate with the monitoring device, to sense the hydrogen concentration outside the hydrogen generator to generate an external sensing result;

wherein, the monitoring device controls the operation of the hydrogen generator according to the external sensing result.

5. The hydrogen generator of claim 4, wherein the monitoring device is coupled to the electrolytic module, the monitoring device turns off or reduces the operating efficiency of the electrolytic module according to the external sensing result.

6. The hydrogen generator of claim 1, further comprising:

a nebulizer coupled to the gas outlet passageway to receive the gas comprising hydrogen, wherein the nebulizer generates an atomized gas and mix the atomized gas with the gas comprising hydrogen to form a healthy gas, wherein the gas comprising hydrogen flows through the condensate filter, the humidification cup and the nebulizer by the way of the integrated passageway device.

7. The hydrogen generator of claim 1, further comprising:

a water tank configured to accommodate the electrolyzed water, wherein the electrolytic module is fluidly coupled to the water tank, the water tank outputs the gas comprising hydrogen generated by the electrolytic module, and the humidification cup is fluidly coupled to on the tank.

8. The hydrogen generator of claim 7, wherein the integrated passageway device is stacked vertically on the humidification cup.

9. The hydrogen generator of claim 7, wherein the humidification cup further has a humidification chamber and a communicating room-chamber, the communicating chamber is coupled to the water tank and the condensate filter, the communicating reem-chamber is configured to receive the gas comprising hydrogen outputted from the water tank, the humidification chamber is configured to accommodate supplementary water and receive the gas comprising hydrogen outputted from the condensate filter, and the humidification chamber and the communicating chamber are isolated from each other.

10. The hydrogen generator of claim 6, further comprising a filter rod coupled to the integrated passageway device for filtering the gas comprising hydrogen, wherein the gas comprising hydrogen flows through the condensate filter, the humidification cup, the filter rod and the nebulizer by the way of the integrated passageway device.

11. The hydrogen generator of claim 10, wherein the humidification cup further has a filter chamber, the filter rod is configured in the filter chamber pluggably.

12. The hydrogen generator of claim 10, further comprising:

a hydrogen water cup coupled to the integrated passageway device, wherein the hydrogen water cup is configured to contain water and receive the gas comprising hydrogen to form a hydrogen water;

wherein the gas comprising hydrogen flows through the condensate filter, the humidification cup, the filter rod, the hydrogen water cup and the nebulizer by the way of the integrated passageway device.

13. The hydrogen generator of claim 10, further comprising:

a hydrogen water cup coupled to the integrated passageway device, wherein the hydrogen water cup is configured to contain water, the hydrogen water cup receives the gas comprising hydrogen selectively.

14. A hydrogen generator with hydrogen leakage self-aware function, comprising:

a water tank configured to accommodate a electrolyzed water;

an electrolytic module configured to electrolyze the electrolyzed water to generate gas comprising hydrogen, wherein the electrolytic module is fluidly coupled to the water tank, the water tank outputs the gas comprising hydrogen generated by the electrolytic module;

passageway device connected to the water tank;

a housing configured to accommodating the water tank; and the passageway device;

an external hydrogen sensing component configured outside the housing to sense the hydrogen concentration outside the hydrogen generator to generate an external sensing result; and a monitoring device coupled to the external hydrogen sensing component, wherein the monitoring device controls the operation of the hydrogen generator according to the external sensing result.

15. A hydrogen generator with hydrogen leakage self-aware function, comprising:

an electrolytic module configured to electrolyze an electrolyzed water to generate gas comprising hydrogen;

passageway device;

a condensate filter coupled to the passageway device for filtering the gas comprising hydrogen generated by the electrolytic module;

a humidification cup coupled to the passageway device for humidifying the gas comprising hydrogen;

a housing configured to accommodating the electrolytic module, the integrated passageway device, the humidification cup, and the condensate filter;

an internal hydrogen sensing component configured in the housing for sensing the hydrogen concentration in the hydrogen generator to generate an internal sensing result; and a monitoring device coupled to the internal hydrogen sensing component, wherein the monitoring device controls the operation of the hydrogen generator according to the internal sensing result.

16. The hydrogen generator of claim 15, further comprising:

a hydrogen water cup coupled to the passageway device, wherein the hydrogen water cup is configured to contain water, the hydrogen water cup receives the gas comprising hydrogen selectively, when the gas comprising hydrogen flows into the hydrogen water cup, the gas comprising hydrogen mixes with the water in the hydrogen water cup to form a hydrogen water.

17. The hydrogen generator of claim 15, wherein the sensed hydrogen concentration is caused by a hydrogen leakage within the hydrogen generator.

18. The hydrogen generator of claim 15, further comprising:

a water tank configured to accommodate an electrolyzed water, wherein the water tank is fluidly coupled to the electrolytic module; and a hydrogen water cup coupled to the passageway device, wherein the hydrogen water cup is configured to contain another water;

wherein the humidification cup configured to accommodate a supplementary water, the electrolyzed water, the another water and the supplementary water are configured to divide the hydrogen generator into multi-zone fire prevention regions.

* * * * *